United States Patent
Zhang (10) Patent No.: US 9,708,956 B1
(45) Date of Patent: Jul. 18, 2017

(54) EMISSION CONTROL SYSTEM AND REDUCTANT INJECTOR

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/092,270

(22) Filed: Apr. 6, 2016

(51) Int. Cl.
   *F01N 3/00* (2006.01)
   *F01N 3/20* (2006.01)

(52) U.S. Cl.
   CPC ...... *F01N 3/208* (2013.01); *F01N 2610/1453* (2013.01); *F01N 2900/1404* (2013.01)

(58) Field of Classification Search
   USPC .......... 60/286, 295, 297, 301, 303; 239/128, 239/129, 132.1, 132.3
   See application file for complete search history.

(56) References Cited

U.S. PATENT DOCUMENTS

| | | | |
|---|---|---|---|
| 4,662,172 A * | 5/1987 | Shinzawa | F02B 3/02 431/248 |
| 6,045,054 A | 4/2000 | Peterson, Jr. | |
| 6,526,746 B1 * | 3/2003 | Wu | F01N 3/2066 239/585.1 |
| 7,497,077 B2 * | 3/2009 | Dodge | F01N 3/2066 239/406 |
| 7,762,061 B2 * | 7/2010 | Birkby | F01N 3/0253 222/145.5 |
| 8,438,839 B2 * | 5/2013 | Floyd | B01F 3/04049 239/129 |
| 8,549,842 B2 * | 10/2013 | Park | F01N 3/2066 239/429 |
| 8,978,364 B2 * | 3/2015 | Olivier | F01N 3/2066 239/124 |
| 2008/0105441 A1 | 5/2008 | Metzger | |
| 2013/0043330 A1 | 2/2013 | Corless | |

* cited by examiner

*Primary Examiner* — Binh Q Tran
(74) *Attorney, Agent, or Firm* — Julia Voutyras; McCoy Russell LLP

(57) ABSTRACT

An emission control system for an engine is described herein. The emission control system includes a reductant injector extending into an exhaust conduit upstream of a catalyst. The reductant injector includes a reductant passage selectively receiving reductant from a reductant reservoir, an exhaust gas inlet receiving exhaust gas from the exhaust conduit, and an interior exhaust passage adjacent to the reductant passage, the interior exhaust passage receiving exhaust gas from the exhaust gas inlet and fluidly separated from the reductant passage.

20 Claims, 5 Drawing Sheets

EMISSION CONTROL SYSTEM AND REDUCTANT INJECTOR

BACKGROUND/SUMMARY

Engine may implement a strategy called selective catalytic reduction (SCR) to reduce engine emission in exhaust systems. SCR is a process where a gaseous or liquid reductant (e.g., ammonia, urea, etc.,) is introduced into an exhaust conduit upstream of a catalyst. The SCR strategy converts $NO_x$ into $N_2$ and water in the exhaust stream, reducing engine emissions and therefore the engine's impact on the environment. However, a number of factors can impact SCR performance. For example, decreased reductant injection atomization, caused by low pressure reductant injection, can negatively affect SCR operation. Reduced reductant evaporation, during cold starts for example, can also decrease $NO_x$ conversion in the catalyst. Incomplete flow mixing of the reductant and the exhaust gas can also decrease $NO_x$ conversion in the catalyst. In previous emission control systems a mixing device, downstream of a reductant injector, may be provided to improve SCR performance. However, the mixing device may be costly, bulky, and increase exhaust backpressure. Furthermore, mixing devices do not significantly improve reductant atomization and evaporation in the exhaust system. Thus, mixing devices may not enable the SCR catalyst to achieve desirable $NO_x$ conversion levels.

To address at least some of the aforementioned problems, an emission control system in an engine is provided. An emission control system for an engine is described herein. The emission control system includes a reductant injector extending into an exhaust conduit upstream of a catalyst. The reductant injector includes a reductant passage selectively receiving reductant from a reductant reservoir, an exhaust gas inlet receiving exhaust gas from the exhaust conduit, and an interior exhaust passage adjacent to the reductant passage, the interior exhaust passage receiving exhaust gas from the exhaust gas inlet and fluidly separated from the reductant passage.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
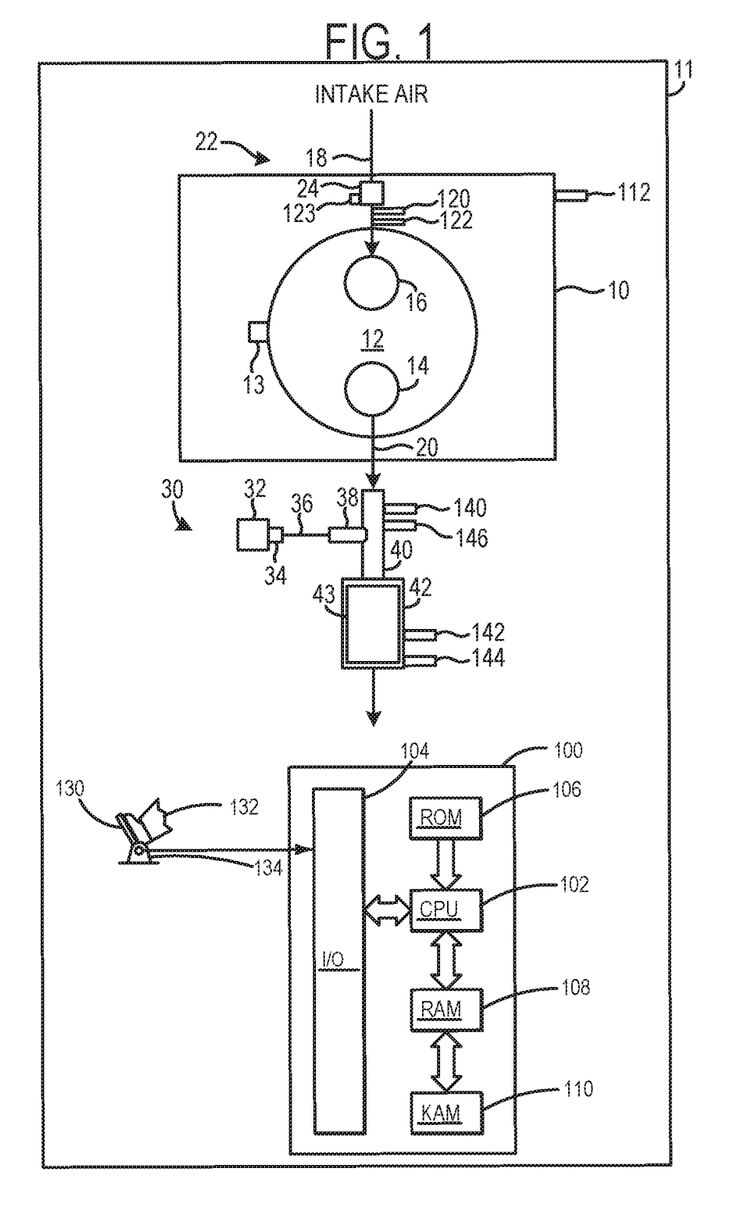
FIG. 1 shows a schematic depiction of an engine including an emission control system.
Figure 2:
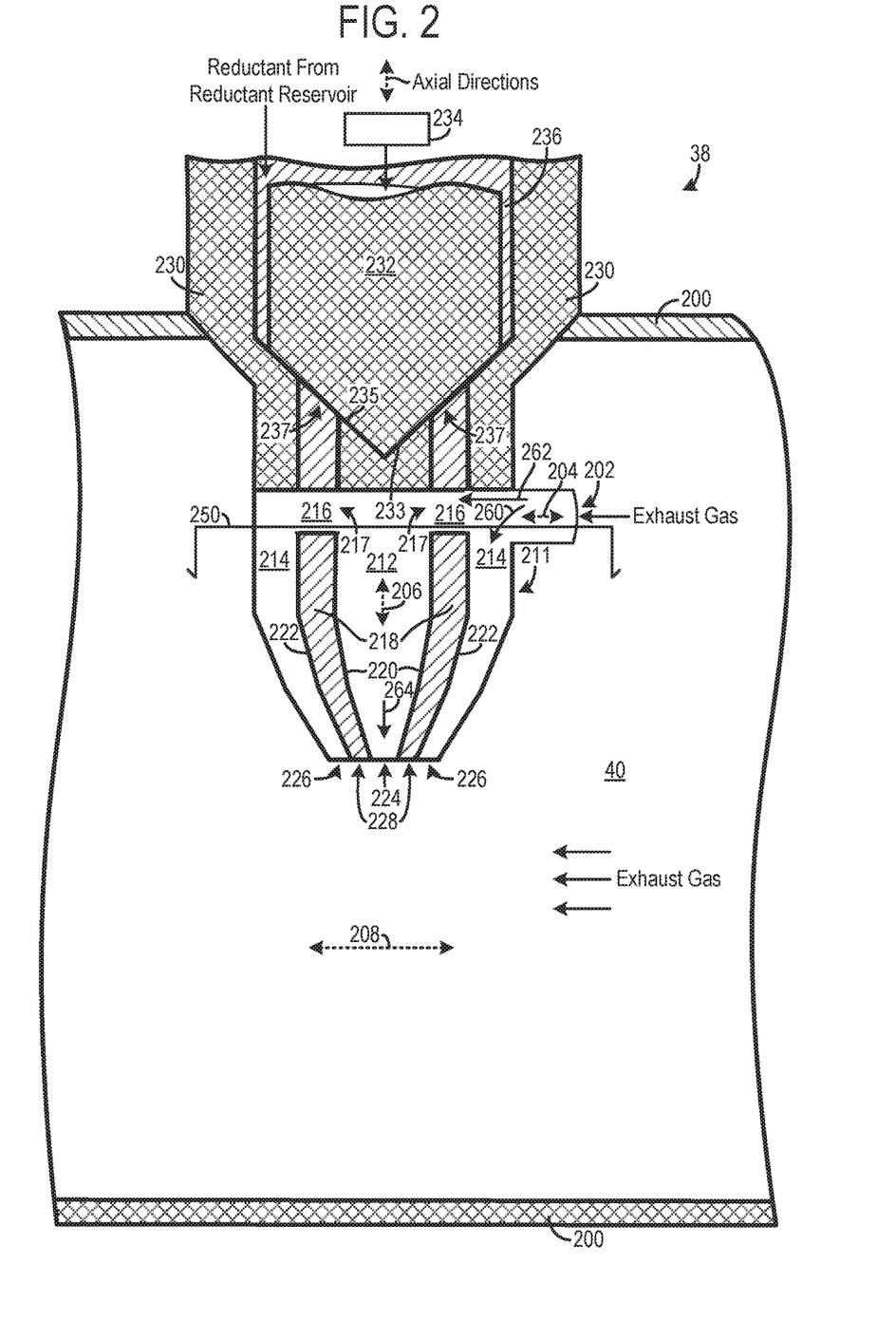
FIG. 2 shows an exemplary depiction of a reductant injector in the emission control system shown in FIG. 1 in a closed configuration.
Figure 3:
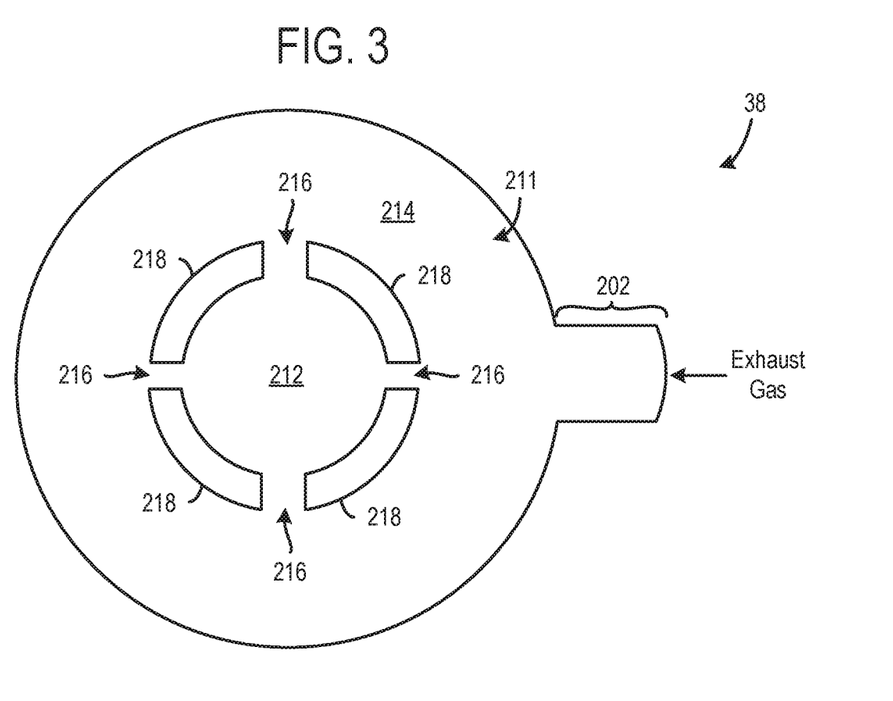
FIG. 3 shows a cross-sectional view of the reductant injector shown in FIG. 2.
Figure 4:
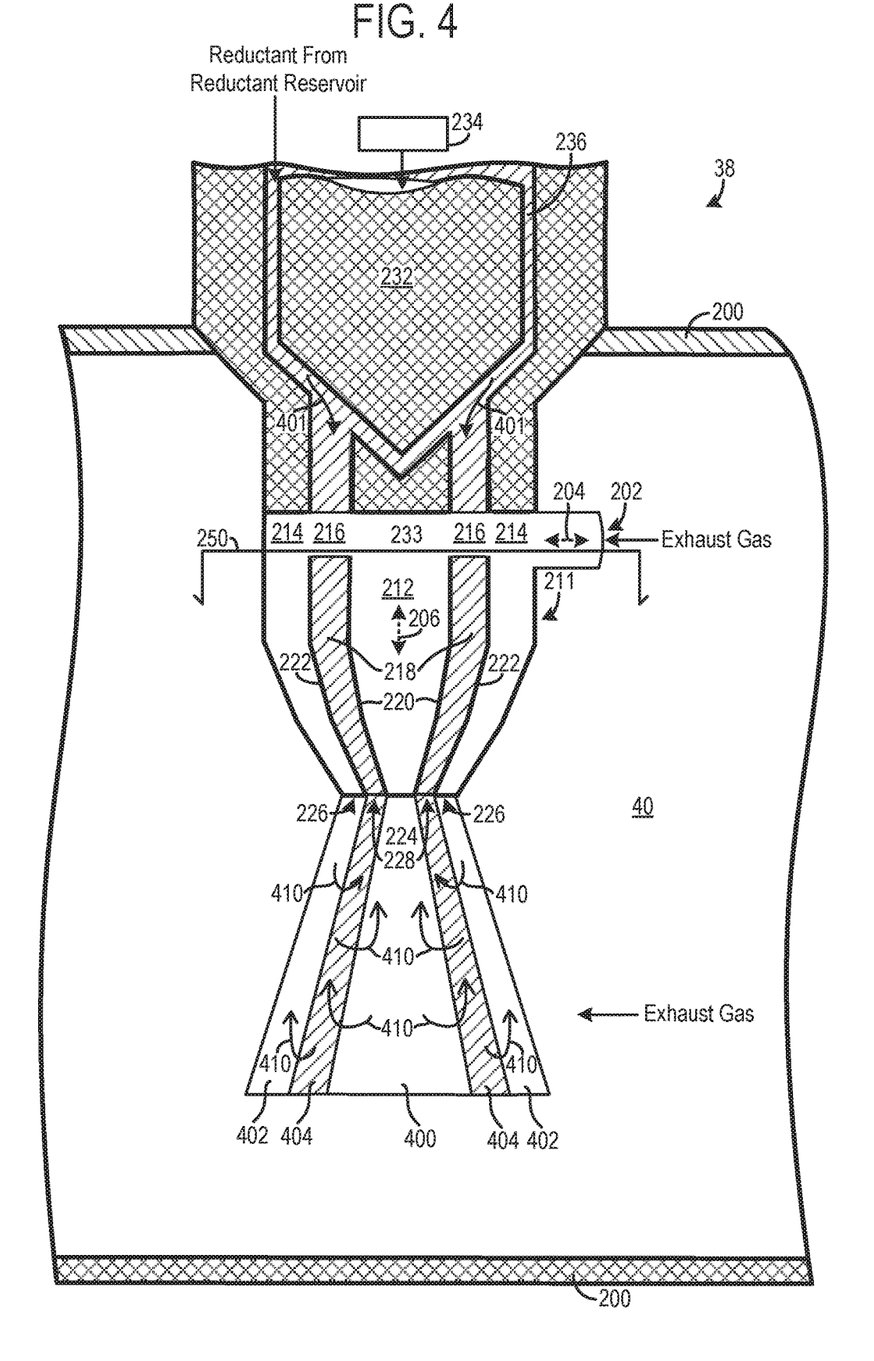
FIG. 4 shows a depiction of the reductant injector in FIG. 2 in an open configuration.
Figure 5:
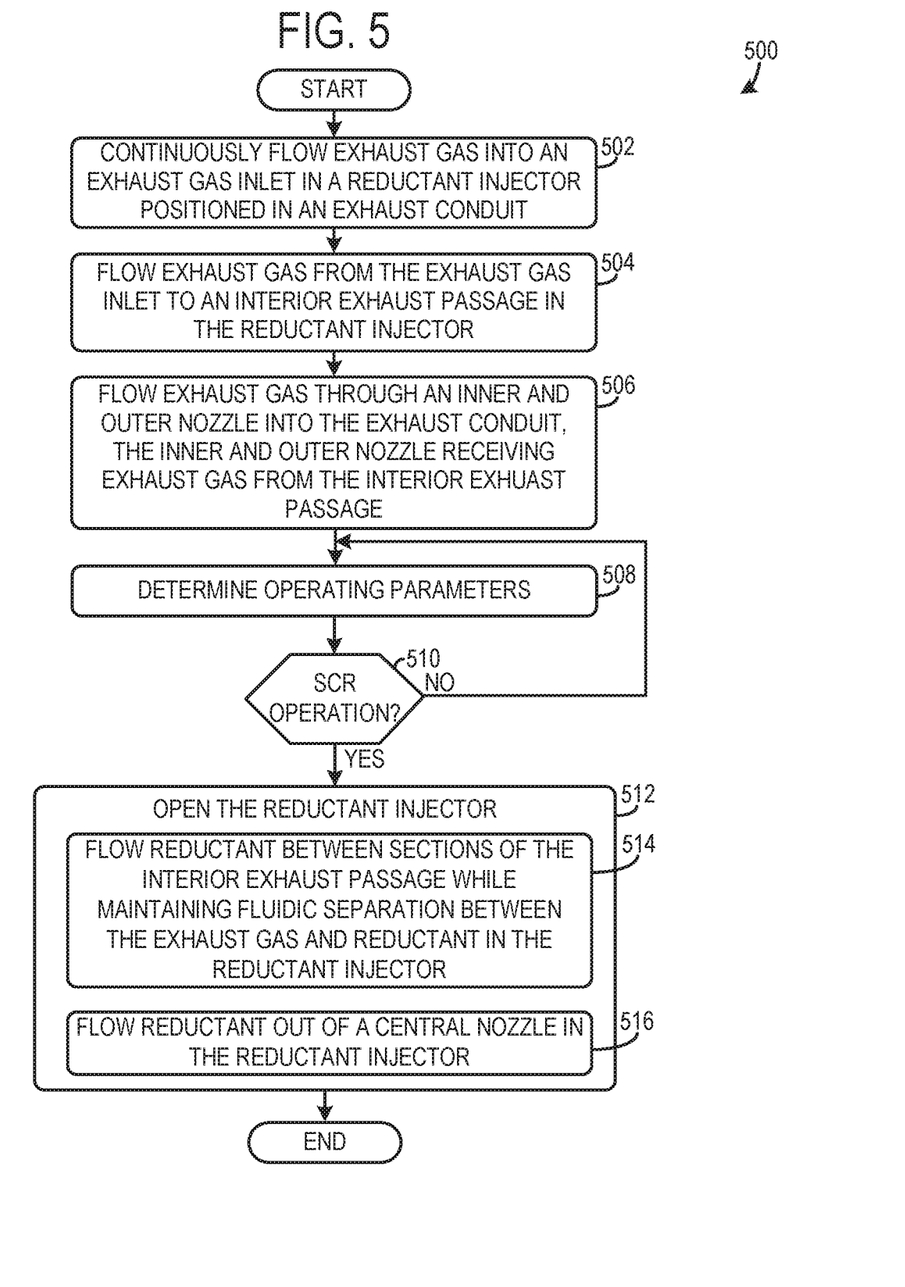
FIG. 5 shows a method for operation of an emission control system.

An emission system with a reductant injector that promotes increased flow mixing, reductant atomization, and reductant vaporization is described herein. The increased reductant vaporization can be achieved by exhaust passages routed next to (e.g., between) and fluidly separated from reductant passages in the interior of a reductant injector. Routing exhaust flow through the reductant injector enables heat to be transferred from the hot exhaust gas to the reductant via common walls separating the reductant and exhaust gas, thereby increasing the temperature of the reductant. Consequently, evaporation of the reductant injected into the exhaust stream in the exhaust conduit is increased. Additionally, the reductant flowing from the reductant injector may have a high pressure. When a reductant stream with high pressure is injected adjacent to an exhaust stream traveling through the reductant injector, atomization of injected reductant is increased. Specifically, when the reductant is injected at a high pressure a vacuum is created at the tip of the reductant injector which brings together neighboring exhaust gas with the reductant. This flow pattern is conducive to increasing reductant atomization. Further in one example, the reductant injector may include a central reductant nozzle concentrically arranged with one or more exhaust gas nozzles. The concentric arrangement of the reductant nozzle and exhaust gas nozzle(s) further promotes flow mixing in the exhaust conduit in which the reductant is injected. Increased flow mixing, reductant atomization, and reductant evaporation work in concert to increase the amount of $NO_x$ converted in a downstream catalyst. As a result, engine emissions can be reduced, thereby diminishing the engine's impact on the environment and improving engine operation. FIG. 1 shows a schematic depiction of an engine and emission control system, FIGS. 2-4 shows an exemplary reductant injector included in the emission control system in FIG. 1, and FIG. 5 shows a method for operation of a reductant injector in an emission control system.

FIG. 1 shows a schematic depiction of an internal combustion engine 10 in a vehicle 11 with at least one cylinder 12 and is controlled by an electronic engine controller 100. Engine 10 includes a cylinder 12 with a piston (not shown) positioned therein and connected to a crankshaft (not shown). A fuel injector 13 is shown coupled to the cylinder 12. Additionally or alternatively a port injector may be included in the engine 10. It will be appreciated that the fuel injector 13 receives fuel from a fuel delivery system (now shown) that may include a fuel tank, fuel pump, fuel rail, etc.

During operation, each cylinder within engine 10 typically undergoes a four-stroke cycle: the cycle includes an intake stroke, compression stroke, expansion stroke, and exhaust stroke. During the intake stroke, generally, an exhaust valve 14 closes and intake valve 16 opens. Air is introduced into the cylinder 12 via an intake conduit 18 (e.g., intake manifold), and the piston moves to the bottom of the cylinder to increase the volume within cylinder 12. The position at which piston is near the bottom of the cylinder and at the end of its stroke (e.g., when cylinder is at its largest volume) is typically referred to by those of skill in the art as bottom dead center (BDC). During the compression stroke, the intake valve 16 and the exhaust valve 14 are closed. The piston moves toward the cylinder head to compress the air within the cylinder 12. The point at which the piston is at the end of its stroke and closest to the cylinder head (e.g., when cylinder 12 is at its smallest volume) is typically referred to by those of skill in the art as top dead center (TDC). In a process hereinafter referred to as injection, fuel is introduced into the cylinder. In a process hereinafter referred to as ignition, the injected fuel is ignited by known ignition means such as a spark plug or compression, resulting in combustion. During the expansion stroke, the expanding gases push the piston back to BDC. The crankshaft converts piston movement into a rotational torque of the rotary shaft. Finally, during the exhaust stroke, the exhaust valve 14 opens to release the combusted air-fuel mixture to exhaust conduit 20 (e.g., exhaust manifold) and the piston returns to TDC. Note that the above is shown merely as an example, and that intake and exhaust valve opening and/or closing timings may vary, such as to provide positive or negative valve overlap, late intake valve closing, or various other examples. Further, the engine may be a compression ignition engine configured to operate with diesel fuel, for example, and thus during operation ignition via spark plug may be dispensed with.

An intake system 22 is provided in the engine 10 and configured to provide intake air to an intake valve 16 coupled to the cylinder 12. The intake system 22 includes a throttle 24 coupled to an intake conduit 18 providing intake air to the intake valve 16. The throttle 24 is configured to adjust the amount of intake air provided to the cylinder 12. Additional components may be included in the intake system 22, such as additional conduits, a compressor, an intake manifold, etc., that assist in providing intake air to the cylinder and/or provide other useful functions such as providing boost, cooling, etc. Further in one example, the intake system 22 can include the intake valve 16.

An emission control system 30 is also shown in FIG. 1. The emission control system 30 is configured to receive exhaust gas from the exhaust valve 14. The emission control system 30 includes a reductant reservoir 32 and a reductant pump 34. A reductant conduit 36 is positioned between the reductant pump 34 and a reductant injector 38 and enables reductant to flow therebetween. FIG. 1 schematically depicts the reductant injector 38. However, it will be appreciated that the reductant injector 38 may have additional features, functionality, complexity, etc., that is illustrated in greater detail herein. Furthermore, both the reductant conduit 36 and the reductant injector 38 can be included in the emission control system 30.

The reductant reservoir 32 is configured to hold reductant (e.g., urea, ammonia, etc.) which may be in a liquid form, in one example. Furthermore, the reductant reservoir 32 may also include a fill port enabling the reservoir to be refilled by a user. The reductant pump 34 is configured to convey reductant between the reductant reservoir 32 and the reductant injector 38. The reductant pump 34 may be designed to increase the pressure of the reductant above a desired level. In one example, one liquid urea pump can be used in the system may be designed to deliver injection pressure from 50 to 70 bar. In yet another example, the emission control system 30 may include a second reductant pump (e.g., higher pressure pump) to enable the reductant to reach a higher pressure level.

As shown, the reductant injector 38 is coupled to an exhaust conduit 40 upstream of a catalyst 42 (e.g., selective catalyst reduction (SCR) catalyst). It will be appreciated that the catalyst 42 as well as exhaust conduits 40 and/or 20 can also be included in the emission control system 30. The catalyst 42 may include a catalyst bed 43 configured to receive exhaust gas and reductant, during selected time intervals, and convert $NO_x$ into $N_2$, in one example. The catalyst bed 43 may include materials such as base-metal oxides, zeolites, and/or any other materials that enable $NO_x$ conversion in the catalyst. For instance, the catalyst bed 43 may include a honeycomb structure coated with zeolite. However, numerous suitable catalyst bed configurations have been contemplated.

In other examples, the emission control system 30 may include additional components such as additional catalyst(s) (e.g., oxidation catalyst), a filter (e.g., diesel particulate filter), a turbine, an exhaust gas recirculation branch, etc. These components may be positioned upstream/downstream of the catalyst 42 and/or reductant injector 38. The emission control system 30 may also include a valve positioned in the reductant conduit 36. The valve may be configured to adjust the amount of reductant flowing therethrough.

Controller 100 is shown in FIG. 1 as a conventional microcomputer including: microprocessor unit 102, input/output ports 104, read-only memory 106, random access memory 108, keep alive memory 110, and a conventional data bus. Controller 100 is shown receiving various signals from sensors coupled to engine 10, in addition to those signals previously discussed, including: engine coolant temperature (ECT) from temperature sensor 112 coupled to a cooling sleeve, for example; a position sensor 134 coupled to an accelerator pedal 130 for sensing force applied by foot 132; a measurement of engine manifold pressure (MAP) from pressure sensor 122 coupled to the intake conduit 18; an engine position sensor from a Hall effect sensor (not shown) sensing crankshaft position; a measurement of air mass entering the engine from sensor 120; and a measurement of throttle position from sensor 123. Barometric pressure may also be sensed (sensor not shown) for processing by controller 100. Controller 100 may also receive signals from sensors located in the emission control system 30 such as exhaust gas composition sensor 140, temperature sensor 142, catalyst bed sensor 144 configured to determine catalyst oxidation, and/or airflow sensor 146. The controller 100 may also be configured to trigger one or more actuators in the engine 10 and specifically the emission control system 30. For instance, the controller 100 may be configured to adjust the throttle 24, the reductant injector 38, fuel injector 13, reductant pump 34, etc. Specifically, the controller 100 may be configured to command the emission control system 30 and in particular the reductant injector 38 to perform SCR operation during selected time intervals. Therefore, the controller 100 receives signals from the various sensors of FIG. 1 and employs the various actuators of FIG. 1 to adjust engine operation based on the received signals and instructions stored on a memory of the controller.

FIGS. 2-4 show a detailed illustration of an exemplary reductant injector 38. Specifically, FIG. 2 shows the reductant injector in a closed configuration where reductant injection is inhibited and FIG. 4 shows the reductant injector in an open configuration where reductant injection is permitted. FIG. 3 shows a cross-section of the reductant injector illustrating the interior passages. The reductant injector 38 includes several features which enable increased reductant evaporation and atomization to be achieved in the emission control system 30, when compared to previous emission control systems.

In FIG. 2 the reductant injector 38 is shown extending into exhaust conduit 40 through a conduit wall 200. It will be appreciated that the exhaust conduit 40 is upstream of the catalyst 42, shown in FIG. 1. The reductant injector 38 includes an exhaust gas inlet 202 receiving exhaust gas flow from the exhaust conduit 40. In this example, the exhaust gas that is routed internally in and through the injector is received at the prevailing exhaust pressure in the passage of the exhaust surrounding the exterior of the injector, as opposed to an external source of exhaust gas that may be at a different pressure than the exhaust into which the reductant is injected. In this way, the exhaust gas traveling through the injector may not be pressurized by a pump or other pressure-generating device, but rather the flow may be generated via the prevailing exhaust gas flow in the passage captured by the upstream facing inlet.

As illustrated, the exhaust gas inlet 202 (e.g., an axis 204 of the exhaust gas inlet 202) is perpendicular to a central axis 206 of the reductant injector 38. Additionally as illustrated in FIG. 2 the exhaust gas inlet 202 is parallel to a central axis 208 of the exhaust conduit 40. When the exhaust gas inlet 202 is arranged in this manner the flowrate of exhaust gas entering the reductant injector 38 can be increased. Increasing the amount of exhaust gas flowing through the reductant injector 38 enables the amount of reductant evaporation to be increased. Consequently, the conversion rate of $NO_x$ in the downstream catalyst 42, shown in FIG. 1, can be increased. However, other arrangements of the exhaust gas inlet 202 have been contemplated.

The reductant injector 38 includes an interior exhaust passage 211 having an inner section 212, outer section 214, and connection sections 216 fluidly connecting the inner section 212 and the outer section 214. It will be appreciated that exhaust gas may continuously flow through the exhaust gas inlet 202 and the interior exhaust passage 211 during combustion operation in the engine. However, in other examples a valve may be included in the reductant injector to regulate exhaust gas flowing therethrough. Arrow 260 indicates the general flow of exhaust gas from the exhaust gas inlet 202 to the outer section 214 of the interior exhaust gas passage 211. Arrow 262 indicates the general flow of exhaust gas from the exhaust gas inlet 202 to the connection section 216. Additionally, arrow 264 indicates the general flow of exhaust gas through the inner section 212 of the interior exhaust passage 211.

The connection sections 216 extend through a portion 217 of a reductant passage 218. Moreover, the interior exhaust passage 211 is adjacent to the reductant passage 218 and is fluidly separated from the reductant passage. In the depicted example, the inner section 212 and the outer section 214 of the interior exhaust passage 211 is concentrically arranged with the reductant passage 218. The concentric arrangement of the passages enables an increased amount of heat to be transferred from the exhaust gas to the reductant during reductant injection. Additionally, the concentric arrangement of the exhaust and reductant passages in the reductant injector enables the mixing of the reductant and the exhaust gas in the exhaust conduit 40 to be increased. As a result, the conversion of $NO_x$ in the downstream catalyst can be increased.

Additionally, the inner section 212 is surrounded (e.g., circumferentially enclosed) by the reductant passage 218. Moreover, the outer section 214 surrounds the reductant passage 218. However, in other examples the inner section 212 may only be partially surrounded by the reductant passage 218 and/or the outer section 214 may only partially surround the reductant passage 218.

Additionally in the depicted example, the inner section 212 shares a common wall 220 with the reductant passage 218. That is to say that the wall 220 divides (i.e., provides fluidic separation between) the inner section 212 and the reductant passage 218. Another common wall 222 separates the outer section 214 and the reductant passage 218. When the reductant passage and the interior exhaust passage share common walls an increased amount of heat can be transferred from the exhaust gas to the reductant during reductant injection. However other reductant injector configurations have been contemplated. For instance, injectors with multi-layer walls separating the exhaust passage and the reductant passage have been contemplated.

The reductant injector 38 further includes an inner nozzle 224 and an outer nozzle 226 each receiving exhaust gas flow from the interior exhaust passage 211. The reductant injector 38 also includes a central nozzle 228 selectively receiving reductant from the reductant passage 218 based on the configuration (i.e., open or closed configuration) of the reductant injector 38. It will be appreciated that the central nozzle 228 is fluidly separated from the inner and outer nozzles 224 and 226.

Additionally in the depicted example, the outer nozzle 226 and the central nozzle 228 extend toward the central axis 206 of the reductant injector 38. This nozzle arrangement can further promote flow mixing of the reductant an exhaust gas in the exhaust conduit 40 during reductant injection. However, other angular arrangements of the injector nozzles have been contemplated.

The reductant injector 38 also includes mounting boss 230 configured to attach the reductant injector 38 to the exhaust conduit wall 200. The reductant injector 38 also includes an injector needle 232 positioned within a reductant chamber 236. As illustrated, the reductant chamber 236 may be configured to receive reductant from the reductant reservoir 32 shown in FIG. 1. Therefore, reductant in the reductant chamber 236 may circumferentially surround the injector needle 232.

The injector needle 232 includes a downstream end 233. When the reductant injector 38 is in the closed configuration, depicted in FIG. 2, a portion of the downstream end 233 seats and seals on a surface 235 adjacent to an inlet 237 of the reductant passage 218. In this way, the injector needle 232 acts to prevent reductant flow into the reductant passage 218. Thus, the injector needle 232 extends across the inlet 237 of the reductant passage 218. The downstream end 233 tapers in an axial direction extending toward the injector nozzles and comes to a tip, in the illustrated example. However, numerous suitable geometries of the injector needle 232 enabling the needle to block the reductant passage 218 in a closed position have been contemplated.

The reductant injector 38 also include an actuator 234 configured to receive control signals from the controller 100 shown in FIG. 1. The control signals may command the actuator to move the injector needle 232 to open and close the reductant injector 38. Therefore, the injector needle 232 may be moved by the actuator 234 to enable reductant to flow from the reductant chamber 236 into the reductant passage 218. In the depicted example, the actuator 234 can move the injector needle 232 in axial directions to open and close the reductant injector 38. Further in one example, the actuator 234 may be directly coupled to the injector needle 232. In such an example, the actuator 234 may be a solenoid or other suitable actuation mechanism.

The reductant injector 38 depicted in FIG. 2 is in a closed configuration and therefore the injector needle 232 prevents reductant flow from the reductant chamber 236 to the reductant passage 218. In other examples, the actuator 234 may be configured to rotate the reductant injector to open and close the injector. Rotating the reductant injector 38 can enable backpressure to be reduced in the exhaust system when reductant injection is not occurring. In such an example, the exhaust gas inlet 202 may be aligned with (e.g., substantially parallel to) the central axis 208 of the exhaust conduit 40 when the reductant injector is open. That is to say that the exhaust gas inlet 202 may be aligned with the general direction of exhaust gas flow in the exhaust conduit 40 in the open configuration. On the other hand, in the closed configuration the exhaust gas inlet 202 may not be aligned with the central axis 208 of the exhaust conduit 40 when the reductant injector 38 is in the closed configuration. Continuing with this example, the injector needle 232 may have a different configuration where rotation of the injector body with respect the needle, or vice-versa, blocks and permits reductant flow into the reductant passage 218. Additionally, the cutting plane 250 for the cross-section illustrated in FIG. 3 is shown in FIG. 2.

FIG. 3 shows a cross-section of the reductant injector 38. The exhaust gas inlet 202 and reductant passage 218 are illustrated in FIG. 3. Additionally, the inner section 212, outer section 214, and connection sections 216 of the interior exhaust passage 211 are also shown in FIG. 2. As illustrated, the reductant passage 218, the inner section 212, and the outer section 214 are concentrically arranged with respect to one another. The concentric arrangement enables a large amount of heat to be transferred from the exhaust gas to the reductant during reductant injection thereby increasing reductant evaporation in the exhaust stream where the reductant is injected. Additionally, the connection sections 216 are also shown extending through the reductant passage 218.

FIG. 4 shows the reductant injector 38 in an open configuration. The actuator 234 may be commanded by the controller 100, shown in FIG. 1, to move the injector needle 232 to enable reductant to be flowed into the reductant passage 218 from upstream components (i.e., reductant conduit 36, reductant reservoir 32, shown in FIG. 1, etc.) Arrows 401 illustrate the flow of reductant from the reductant chamber 236 to the reductant passage 218.

In one example, the controller 100 may be configured to command the actuator 234 to open and close the reductant injector 38 based on catalyst oxidation state and exhaust temperature. For instance, when the exhaust temperature decreases or is below a threshold value the reductant injector may be opened to permit reductant injection. In another example, when the conversion rate in the catalyst is less than a threshold value the reductant injector may be opened. In this way, reductant may be selectively injected from the injector to increase $NO_x$ conversion in the catalyst. After the actuator 234 opens the reductant injector 38 reductant is flowed through the reductant passage 218 while exhaust gas is continuously flowed through various sections (i.e., inner section 212, outer section 214, and connection sections 216,) of the interior exhaust passage 211 receiving exhaust gas from the exhaust gas inlet 202. Thus, separate exhaust and reductant streams are flowed adjacent to one another to increase the temperature of the reductant. It will be appreciated that the reductant traveling through the reductant passage 218 and the exhaust gas traveling through the interior exhaust passage 211 remain unmixed across the length of each respective passage during reductant injection operation, in the depicted example. However, in other examples mixing of the reductant and exhaust gas may occur in the reductant injector. Moreover, the reductant flow through the reductant passage 218 may be at a higher pressure than the exhaust gas flowing through the interior exhaust passage 211.

The inner nozzle 224, the outer nozzle 226, and the central nozzle 228 are also depicted in FIG. 4. The inner nozzle stream 400, outer nozzle stream 402, and central nozzle stream 404 are also generally shown in FIG. 4. Arrows 410 depict the flow mixing of the reductant in the central nozzle stream 404 and the exhaust gas in the inner and outer nozzle streams 400 and 402. As previously discussed, the flow mixing of the reductant and exhaust gas increases the $NO_x$ conversion in the downstream catalyst. It will be appreciated that the flow pattern of the reductant and exhaust gas may be far more complex than the flow pattern depicted in FIG. 4 and the flow pattern depicted in FIG. 4 is provided to aid in understanding of the general flow characteristics.

Additionally, it will be appreciated that reductant may be injected through the central nozzle 228 at a high pressure. When this high pressure reductant stream is injected adjacent to the exhaust stream, atomization of injected reductant is increased. Specifically, when the reductant is injected at a high pressure a vacuum is created at the tip of the reductant injector 38 which brings together neighboring exhaust gas with the reductant. This flow pattern is conducive to increasing reductant atomization. The axis 204 and central axis 206 are also shown in FIG. 4 for reference.

FIGS. 1-4 show example configurations with relative positioning and sizing of the various components, although modifications may be made including changing the relative scaling and positioning of the components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example, FIG. 5 shows a method 500 for operation of a reductant injector in an emission control system. The method 500 may be implemented via the reductant injector and emission control system discussed above with regard to FIGS. 1-4 or may be implemented by another suitable reductant injector and emission control system.

At 502 the method includes continuously flowing exhaust gas into an exhaust gas inlet in a reductant injector positioned in an exhaust conduit. Next at 504 the method includes flowing exhaust gas from the exhaust gas inlet to an interior exhaust passage in the reductant injector. At 506 the method includes flowing exhaust gas through an inner and outer nozzle into the exhaust conduit, the inner and outer nozzle receiving exhaust gas from the interior exhaust passage. Next at 508 the method includes determining operating parameters in the emission control system such as exhaust temperature, catalyst oxidation state, etc.

At 510 the method includes determining of SCR operation should be implemented based on the operating parameters determined at 508. If it is determined that SCR operation should not be implemented (NO at 510) the method returns to 508. However, if it is determined that SCR operation should be implemented (YES at 510) the method advances to 512. At 512 the method includes opening the reductant injector. In this way, the reductant injector may be opened at selected time intervals based on catalyst oxidation state and/or exhaust temperature, for instance. Opening the reductant injector may include steps 514-516. At 514 the method includes flowing reductant between sections of the interior exhaust passage while maintaining fluidic separation between the exhaust gas and reductant in the reductant injector. At 516 the method includes flowing reductant out of a central nozzle in the reductant injector. It will be appreciated that the central nozzle may be adjacent to the inner and outer nozzles having exhaust gas flowing therethrough. Specifically in one example, the central nozzle, inner nozzle, and outer nozzle may be concentrically arranged. Further in one example opening the reductant injector at 508 may include rotating the reductant injector to arrange the reductant injector in the open configuration. In this way, the arrangement of the exhaust gas inlet can be altered with respect to exhaust gas flow in the exhaust conduit to decrease backpressure in the exhaust system.

The subject matter of the present disclosure is further described in the following paragraphs. According to one aspect, an emission control system for an engine is provided. The emission control system includes a reductant injector extending into an exhaust conduit upstream of a catalyst, the reductant injector including: a reductant passage selectively receiving reductant from a reductant reservoir, an exhaust gas inlet receiving exhaust gas from the exhaust conduit, and an interior exhaust passage adjacent to the reductant passage, the interior exhaust passage receiving exhaust gas from the exhaust gas inlet and fluidly separated from the reductant passage.

According to another aspect, a method for operation of a reductant injector in an emission control system is provided. The method includes flowing exhaust gas into a reductant injector from an exhaust conduit in which the reductant injector is position, the exhaust conduit arranged upstream of a catalyst, and when the reductant injector is in an open configuration, flowing reductant between sections of an interior exhaust passage in the reductant injector while maintaining fluidic separation between the exhaust gas and reductant in the reductant injector. According to another aspect, a reductant injector positioned in an exhaust conduit in an emission control system upstream of a catalyst is provided. The reductant injector includes a reductant passage selectively receiving reductant from a reductant reservoir, an exhaust gas inlet receiving exhaust gas from the exhaust conduit during combustion operation in the engine, and an interior exhaust passage receiving exhaust gas from the exhaust gas inlet and fluidly separated from the reductant passage such that the reductant and the exhaust gas flowing through the reductant passage and the interior exhaust passage, respectively, do not mix along their lengths, the reductant passage positioned between two sections of the interior exhaust passage.

In any of the aspects described herein or combinations of the aspects, the reductant traveling through the reductant passage and the exhaust gas flowing through the interior exhaust passage may remain unmixed across a length of each respective passage during reductant injection operation.

In any of the aspects described herein or combinations of the aspects, an outer section of the interior exhaust passage may extend around at least a portion of the reductant passage. In any of the aspects described herein or combinations of the aspects, an inner section of the interior exhaust passage may be surrounded by the reductant passage.

In any of the aspects described herein or combinations of the aspects, the exhaust gas may continuously flow through the interior exhaust passage during combustion operation in the engine.

In any of the aspects described herein or combinations of the aspects, the exhaust gas inlet may be perpendicular to a central axis of the reductant injector.

In any of the aspects described herein or combinations of the aspects, the emission control system may further include an inner nozzle and an outer nozzle receiving exhaust gas from the interior exhaust passage, and a central nozzle selectively receiving reductant from the reductant passage, the central nozzle fluidly separated from the inner and outer nozzles.

In any of the aspects described herein or combinations of the aspects, the emission control system may further include a controller commanding an actuator in the reductant injector to open and close the reductant injector based on one or more of catalyst oxidation state and exhaust temperature.

In any of the aspects described herein or combinations of the aspects, the actuator may be configured to rotate the reductant injector into an open configuration and a closed configuration.

In any of the aspects described herein or combinations of the aspects, the method may further include flowing exhaust gas through an inner nozzle and an outer nozzle in the reductant injector and flowing reductant through a central nozzle, the central nozzle fluidly separated from the inner and outer nozzles.

In any of the aspects described herein or combinations of the aspects, the reductant may be flowed between the sections of the interior exhaust passage during selected time intervals based on catalyst oxidation state and exhaust temperature.

In any of the aspects described herein or combinations of the aspects, the exhaust gas may be continuously flowed into the reductant injector during combustion operation in the engine.

In any of the aspects described herein or combinations of the aspects, the method may further include flowing exhaust gas from the exhaust gas inlet to an inner section of the interior exhaust passage through connection sections fluidly separated from and extending through a portion of a reductant passage through which reductant is flowed in the open configuration.

In any of the aspects described herein or combinations of the aspects, the method may further include rotating the reductant injector to arrange the reductant injector in the open configuration.

In any of the aspects described herein or combinations of the aspects, the reductant injector may further include an inner nozzle and an outer nozzle each receiving exhaust gas from the interior exhaust passage and each flowing exhaust gas out of the reductant injector and a central nozzle connected to the reductant passage and flowing reductant out of the reductant injector when the reductant injector is in an open configuration.

In any of the aspects described herein or combinations of the aspects, the two sections of the interior exhaust passage may be coupled by connection sections extending through a portion of the reductant passage.

In any of the aspects described herein or combinations of the aspects, the inner nozzle, the central nozzle, and the outer nozzle may be concentrically arranged.

In any of the aspects described herein or combinations of the aspects, the exhaust gas inlet may be perpendicular to a central axis of the reductant injector and the exhaust gas inlet may be parallel to a central axis of the exhaust passage.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. An emission control system for an engine comprising:
a reductant injector extending into an exhaust conduit upstream of a catalyst, the reductant injector including:
a reductant passage selectively receiving reductant from a reductant reservoir;
an exhaust gas inlet receiving exhaust gas from the exhaust conduit; and
an interior exhaust passage adjacent to the reductant passage, the interior exhaust passage receiving exhaust gas from the exhaust gas inlet and fluidly separated from the reductant passage.

2. The emission control system of claim 1, where the reductant traveling through the reductant passage and the exhaust gas flowing through the interior exhaust passage remain unmixed across a length of each respective passage during reductant injection operation.

3. The emission control system of claim 1, where an outer section of the interior exhaust passage extends around at least a portion of the reductant passage.

4. The emission control system of claim 1, where an inner section of the interior exhaust passage is surrounded by the reductant passage.

5. The emission control system of claim 1, where the exhaust gas continuously flows through the interior exhaust passage during combustion operation in the engine.

6. The emission control system of claim 1, where the exhaust gas inlet is perpendicular to a central axis of the reductant injector.

7. The emission control system of claim 1, further comprising an inner nozzle and an outer nozzle receiving exhaust gas from the interior exhaust passage, and a central nozzle selectively receiving reductant from the reductant passage, the central nozzle fluidly separated from the inner and outer nozzles.

8. The emission control system of claim 1, further comprising a controller commanding an actuator in the reductant injector to open and close the reductant injector based on one or more of catalyst oxidation state and exhaust temperature.

9. The emission control system of claim 8, where the actuator is configured to rotate the reductant injector into an open configuration and a closed configuration.

10. A method for operation of a reductant injector in an emission control system comprising:
flowing exhaust gas into a reductant injector from an exhaust conduit in which the reductant injector is position, the exhaust conduit arranged upstream of a catalyst; and
when the reductant injector is in an open configuration, flowing reductant between sections of an interior exhaust passage in the reductant injector while maintaining fluidic separation between the exhaust gas and reductant in the reductant injector.

11. The method of claim 10, further comprising flowing exhaust gas through an inner nozzle and an outer nozzle in the reductant injector and flowing reductant through a central nozzle, the central nozzle fluidly separated from the inner and outer nozzles.

12. The method of claim 10, where the reductant is flowed between the sections of the interior exhaust passage during selected time intervals based on catalyst oxidation state and exhaust temperature.

13. The method of claim 10, where the exhaust gas is continuously flowed into the reductant injector during combustion operation in the engine.

14. The method of claim 10, further comprising flowing exhaust gas from the exhaust gas inlet to an inner section of the interior exhaust passage through connection sections fluidly separated from and extending through a portion of a reductant passage through which reductant is flowed in the open configuration.

15. The method of claim 10, further comprising rotating the reductant injector to arrange the reductant injector in the open configuration.

16. A reductant injector positioned in an exhaust conduit in an emission control system upstream of a catalyst comprising:
a reductant passage selectively receiving reductant from a reductant reservoir;
an exhaust gas inlet receiving exhaust gas from the exhaust conduit during combustion operation in the engine; and
an interior exhaust passage receiving exhaust gas from the exhaust gas inlet and fluidly separated from the reductant passage such that the reductant and the exhaust gas flowing through the reductant passage and the interior exhaust passage, respectively, do not mix along their lengths, the reductant passage positioned between two sections of the interior exhaust passage.

17. The reductant injector of claim 16, further comprising:
an inner nozzle and an outer nozzle each receiving exhaust gas from the interior exhaust passage and each flowing exhaust gas out of the reductant injector; and
a central nozzle connected to the reductant passage and flowing reductant out of the reductant injector when the reductant injector is in an open configuration.

18. The reductant injector of claim 17, where the two sections of the interior exhaust passage are coupled by connection sections extending through a portion of the reductant passage.

19. The reductant injector of claim 17, where the inner nozzle, the central nozzle, and the outer nozzle are concentrically arranged.

20. The reductant injector of claim 16, where the exhaust gas inlet is perpendicular to a central axis of the reductant injector and where the exhaust gas inlet is parallel to a central axis of the exhaust passage.

\* \* \* \* \*